Figure 3:
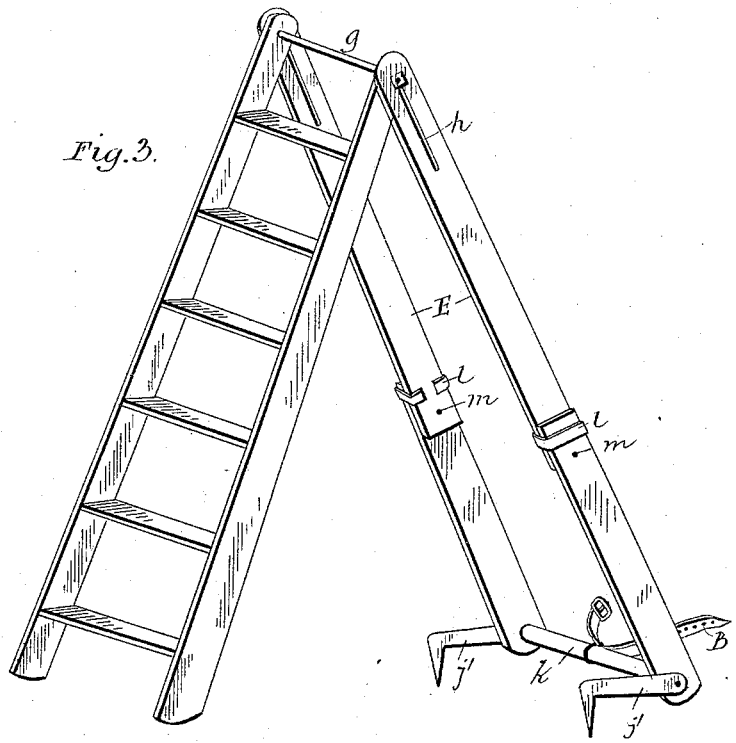

(No Model.) 3 Sheets—Sheet 1.
C. E. KIDDER.
TREE ATTACHMENT FOR SUPPORT OF LADDERS.
No. 416,226. Patented Dec. 3, 1889.
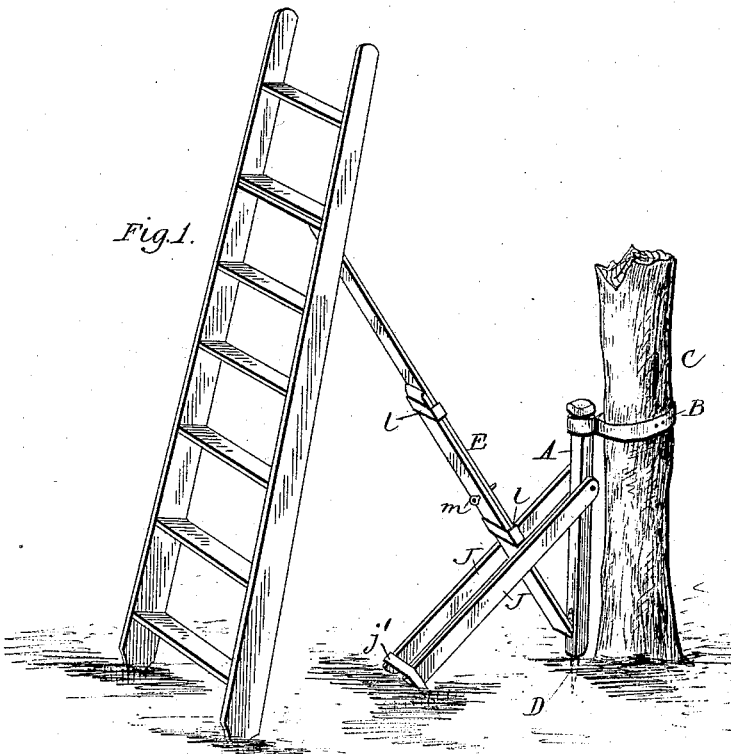
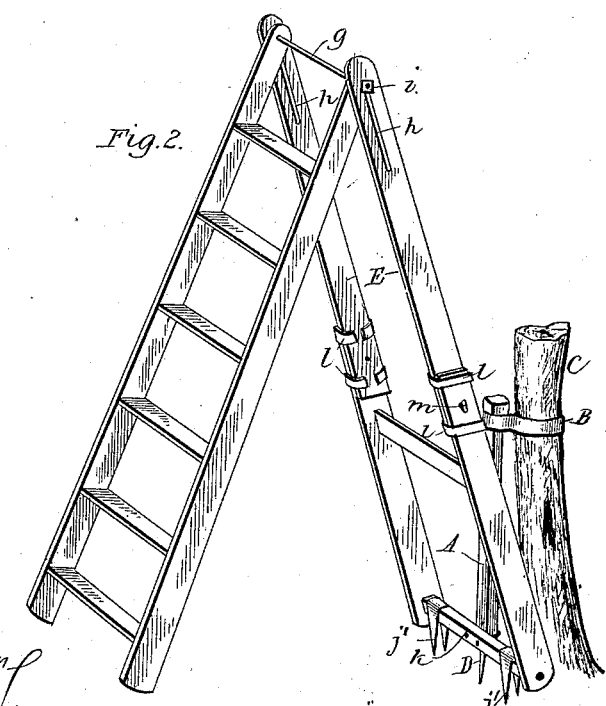

(No Model.) 3 Sheets—Sheet 2.

C. E. KIDDER.
TREE ATTACHMENT FOR SUPPORT OF LADDERS.

No. 416,226. Patented Dec. 3, 1889.

Witnesses
Will T. Norton
L. A. Norton.

Inventor
Charles E. Kidder
By his Attorneys
John J. Halsted & Son (No Model.) 3 Sheets—Sheet 3.
C. E. KIDDER.
TREE ATTACHMENT FOR SUPPORT OF LADDERS.
No. 416,226. Patented Dec. 3, 1889.
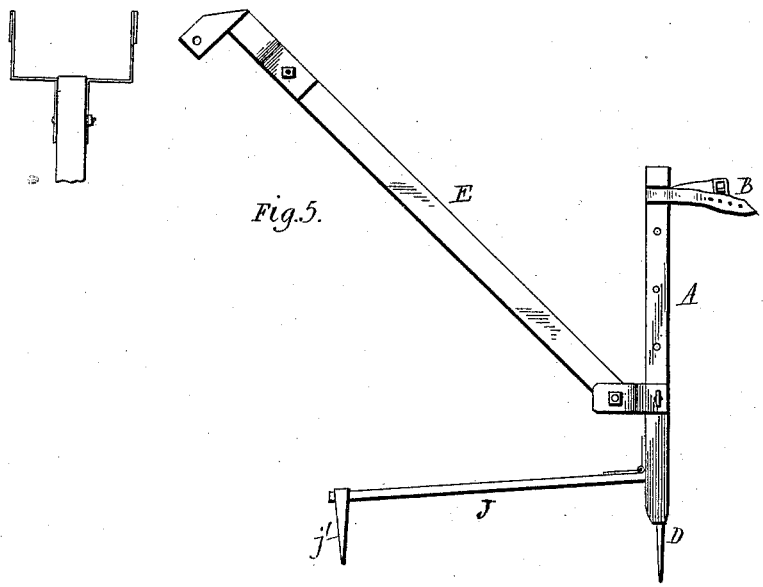
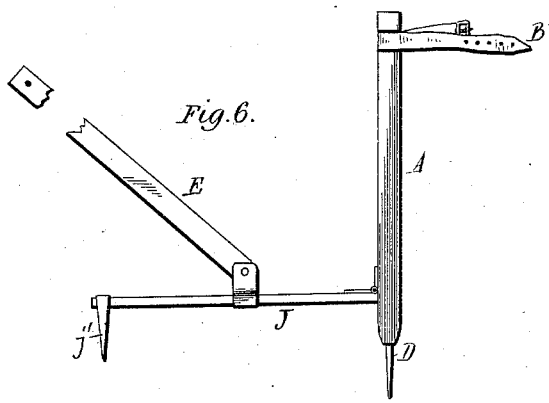
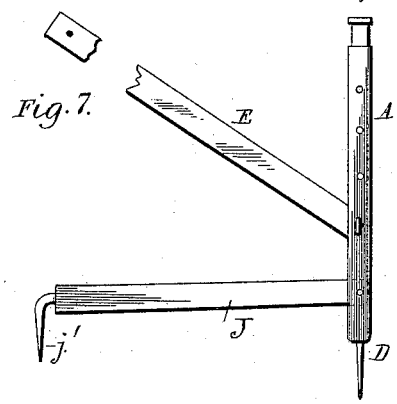
Witnesses
Inventor
Charles E. Kidder
By his Attorneys

United States Patent Office.

CHARLES E. KIDDER, OF AURORA, ILLINOIS.

TREE ATTACHMENT FOR SUPPORT OF LADDERS.

SPECIFICATION forming part of Letters Patent No. 416,226, dated December 3, 1889.

Application filed June 29, 1889. Serial No. 316,016. (No model.)

*To all whom it may concern:*

Be it known that I, CHARLES E. KIDDER, of Aurora, in the county of Kane and State of Illinois, have invented certain new and useful Tree Attachments for Ladder-Supports; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention consists in a structure adapted to be attached to the trunk of a tree and serving as a support for a ladder, to which the structure is attachable, the device or structure being applied to the tree in such manner that the tree becomes a central pivotal support or immovable standard around which as a center the attachment may be moved or turned, the invention also permitting the attachment (and also the ladder when attached to it) to be not only moved on its hinge inward and outward from the tree, but also allowing the ladder to be placed at any point around the tree while the attachment is still secured to the tree, the construction, when used for picking fruit from trees, (and for which it is peculiarly suitable,) thus allowing the placing of a ladder at any point beneath the branches of a tree and to shift it to any other such point without necessarily disconnecting the supporting attachment from the tree, and without any need in any instance of resting the top of the ladder on the tree or its branches.

By the term "attachment" as used in this specification I mean the structure or device as a whole, which I have devised for connecting the tree-trunk to a ladder.

In the drawings, which serve to illustrate the novel character of my invention, Figure 1 shows one form of my tree attachment and which is adapted to be applied to any kind of ordinary ladder. Fig. 2 shows another form slightly varied in detail but involving the same novel features. Figs. 3, 4, 5, 6, and 7 show other variations in the manner of practicing my invention; but all the figures embrace the same leading features of a tree attachment serving as a ladder-support and susceptible of being moved around the tree without being detached or unstrapped from it and in any position in which it may thus be placed, and while still attached to the tree, always permitting a ladder (which for the time being may be connected to it) to be moved nearer to or farther from the tree, as may be desired.

A is an upright provided with any suitable band, strap, or rope B, by means of which it may be secured to or released from the body or trunk of any fruit or other tree C, as shown, and it may also have a steadying pin or spike D at its bottom adapted to enter the ground. To this upright, and preferably at or near its lower end, I connect by a pivot or hinge of any appropriate kind one or more supports E, (see Figs. 1, 2, 5, and 7,) and which at their upper ends are adapted to be connected by a joint to a ladder.

In Fig. 1 the support or brace E is shown as hinged at its lower end, and in Figs. 2, 3, 5, 6, and 7 it is shown as pivoted. Such a construction, as will be evident, allows the attachment to be moved at will around the trunk of a tree without disconnecting or releasing the fastening B from the tree, and also allows the support E (or supports, as the case may be) to be carried around with such upright, and when a ladder shall have been connected by pivotal or hinge connection to the part or parts E it will not only be upheld and sustained thereby, but it will then be in condition to be moved with the attachment not only to any point around the tree-trunk, but also to and from the body of the tree at will.

When a single support E is employed, its upper end may be hinged to a cross-bar near the top of the ladder. When two supports E are employed, they may be connected to a ladder by a metal bolt or rod $g$, and the supports E may have slots $h$ at their upper ends, into which the ends of such rod project, and nuts $i$ on the threaded ends of such rod may serve to prevent the slipping of the rod up and down in the slots.

With the single support E, I prefer to use braces J J, extending outward or downward from the upright to the ground, and a hook or hooks or U-shaped irons $j'$, with pointed ends, are put around the lower ends of these braces and driven into the ground to steady the parts.

With the two supports E, I use a cross-piece $k$ to connect them at their lower ends, and fasten this cross-piece to the ground by U-shaped pointed irons. The cross-piece $k$ may be applied to be slid up and down on the upright A.

The supports E, I make extensible by having them made in two parts sliding one on the other and held by clasps $l$ and any suitable pin or pins $m$. For some purposes, and where there is no need of their extension, the supports may be made of a single piece or pieces, as shown in Figs. 5, 6, and 7.

Instead of having the support E made extensible, the lower end may be arranged to slide up and down on the upright, or on a piece having an up-and-down sliding movement, (see Figs. 5 and 7,) thus giving the same result, as does also the provision of the slots in the upper ends of the supports—namely, of allowing the ladder a longer range of movement back and forth from the tree.

With my invention the tree is in every case the main support for the structure, and consequently for the ladder, and also the pivot on which the whole structure may be turned around the tree whenever desired by simply first raising from the ground any points or projections $j'$, or D, if need be, and in case the strap B be drawn too tight by merely loosening it a little; but another great advantage of my construction is that when it is not desired to move the structure all around or a long distance around the tree it may be moved a considerable distance around the upright A as a center. This gives a wide range for changing the position of the ladder in the arc of a circle around the tree-trunk without the need of lifting the spikes, pins, or hooks from the ground, and, as previously intimated, these spikes, pins, or hooks may be dispensed with when desired. The supports in my invention form no part of the ladder, but are simply attachments for any ladder while picking fruit. The ladder may then be detached and used as a common ladder for any ordinary uses.

Figure 4:
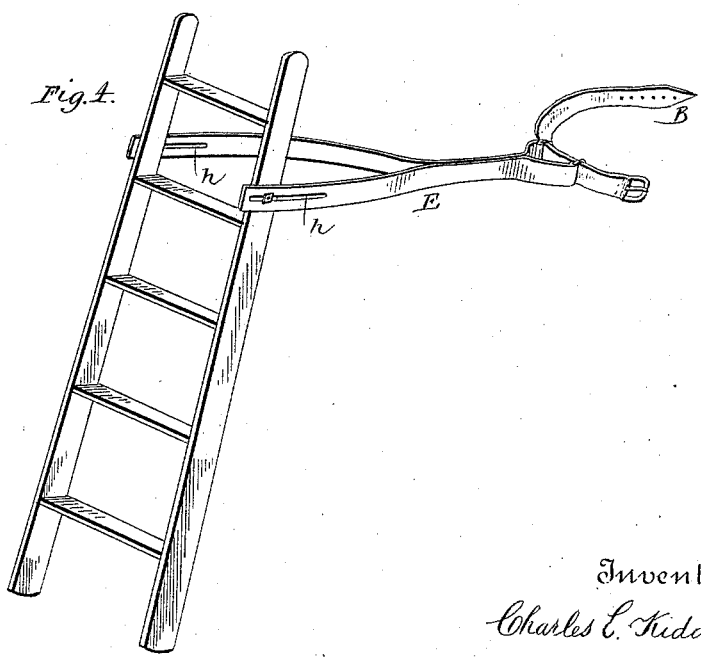

In some cases the construction may be still further simplified, while still retaining the essential features of moving the attachment around the tree to which it is fastened or strapped, and of similarly moving a ladder to which the attachment is applied, and of also moving the ladder nearer to or farther from the tree. Such a variation in the manner of applying my invention is shown in Figs. 3 and 4, in which a support E is strapped directly to the tree, and at its other end is connected to the top of the ladder, the upright in these cases being dispensed with.

The cross-piece $k$ may be fastened to the tree in such a way that the tree shall be the support as well as a pivotal center on which the attachment may be turned, (see Fig. 3;) or the cross-piece may be fastened to an upright and the upright fastened to the tree, the latter in such case also becoming a support for the attachment and a pivot for the same. (See Figs. 1 and 2.) It will be evident also that the ladder-support (or supports, as the case may be) may at the lower end be fastened by a hinge to a piece lying lengthwise and to be fastened to the tree and held to the ground with pins or hooks.

I prefer only one ladder-support hinged at its lower end to an upright, and with the latter attached to the tree with a strap, as already stated, and so that this upright can turn in the loop of the strap when the attachment needs to be turned.

In no sense whatever is my invention a step-ladder; but it is a support for attaching a ladder to a tree. It is made differently from step-ladders, fastened differently, works differently, and is for a different purpose.

I claim—

1. A tree-attaching ladder-support provided with a strap for fastening the same to the trunk of a tree, and whereby such support, as also a ladder attached thereto, may be moved around the body of the tree as a center.

2. A support for ladders provided with a strap for fastening the same to the trunk of a tree, and means, substantially as described, permitting the shifting of a ladder attached to said support either inward or outward relatively to the trunk of the tree, all as set forth.

3. The described means for holding a ladder firm and steady, consisting of a support jointed to the upper part of the ladder, combined with an upright or fixed body jointed to the lower end of such support, the combination permitting the ladder to be moved backward and forward, all substantially as set forth.

4. An extension-ladder support whose lower end is provided with a hinge which is itself fastened to a fixed object, and whereby such support shall retain its place, while the ladder may be moved backward or forward and facilitate the gathering of fruit from different parts of the tree.

5. In a ladder-support, the means, substantially as described, whereby the lower end of the support may be moved up and down, consisting in the combination with the upright of a sliding hinge.

CHARLES E. KIDDER.

Witnesses:
 GEO. H. HALE,
 M. C. RICHARDS.